Nov. 14, 1961  K. M. PENNINGTON  3,008,633
CREDIT MECHANISM EMPLOYING CARD PUNCH MEMBERS
Filed Feb. 26, 1958  2 Sheets-Sheet 1
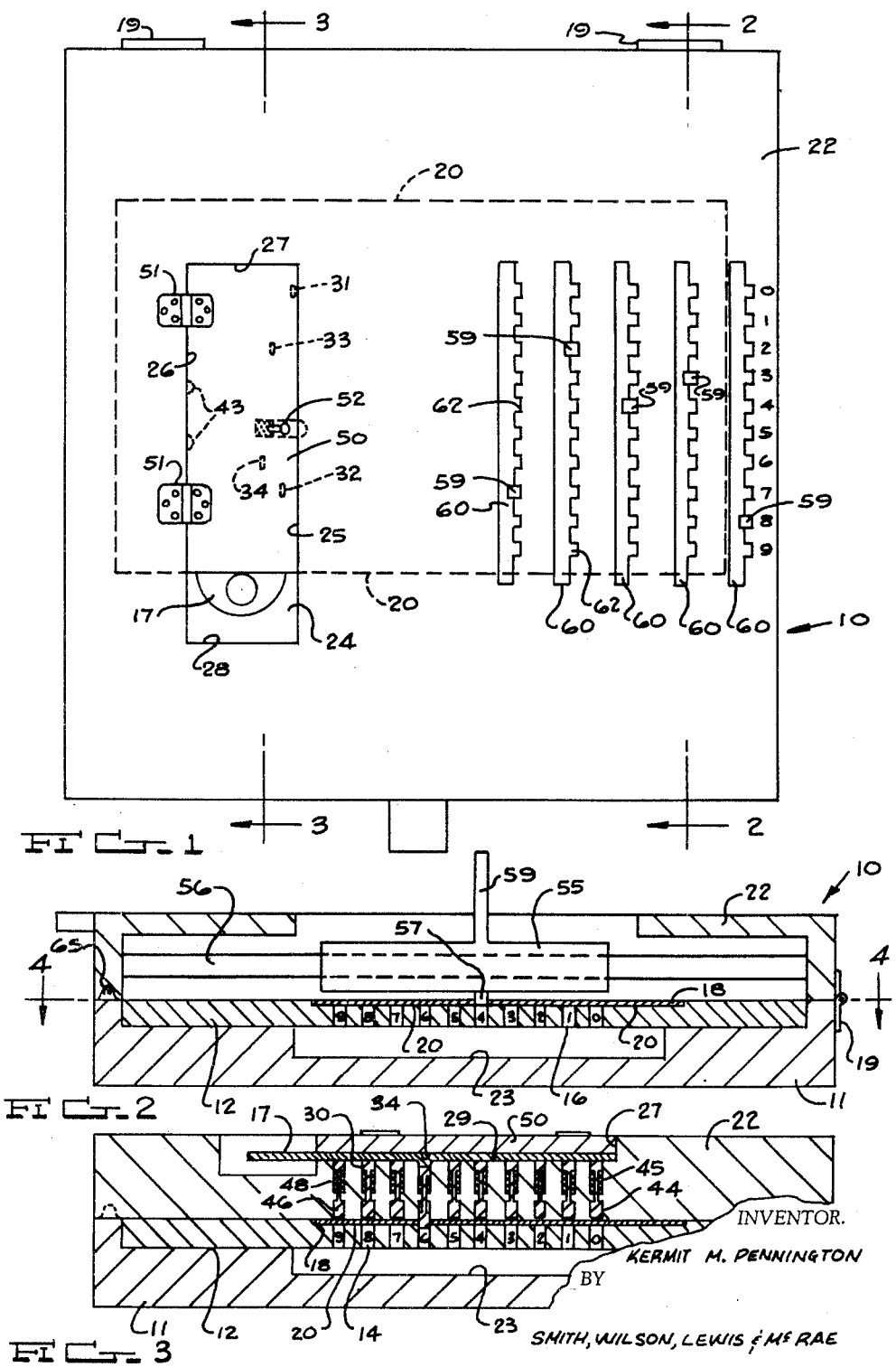
INVENTOR.
KERMIT M. PENNINGTON
BY
SMITH, WILSON, LEWIS & McRAE Nov. 14, 1961 K. M. PENNINGTON 3,008,633
CREDIT MECHANISM EMPLOYING CARD PUNCH MEMBERS
Filed Feb. 26, 1958 2 Sheets-Sheet 2
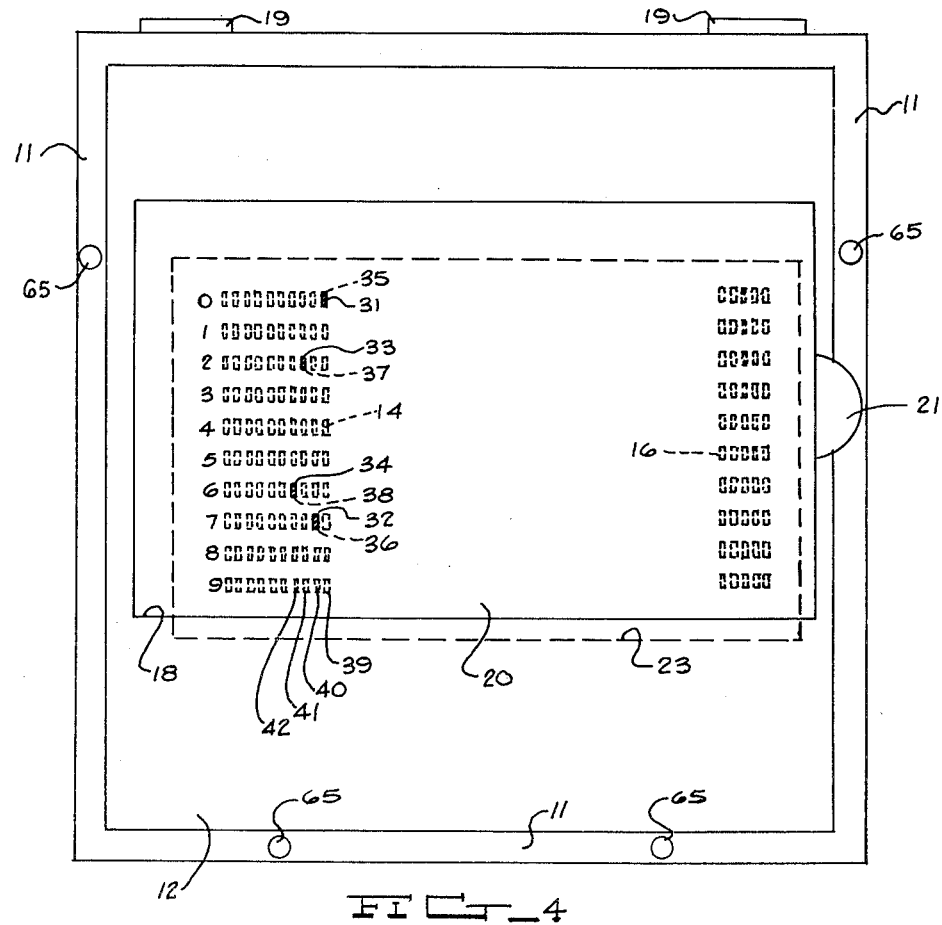
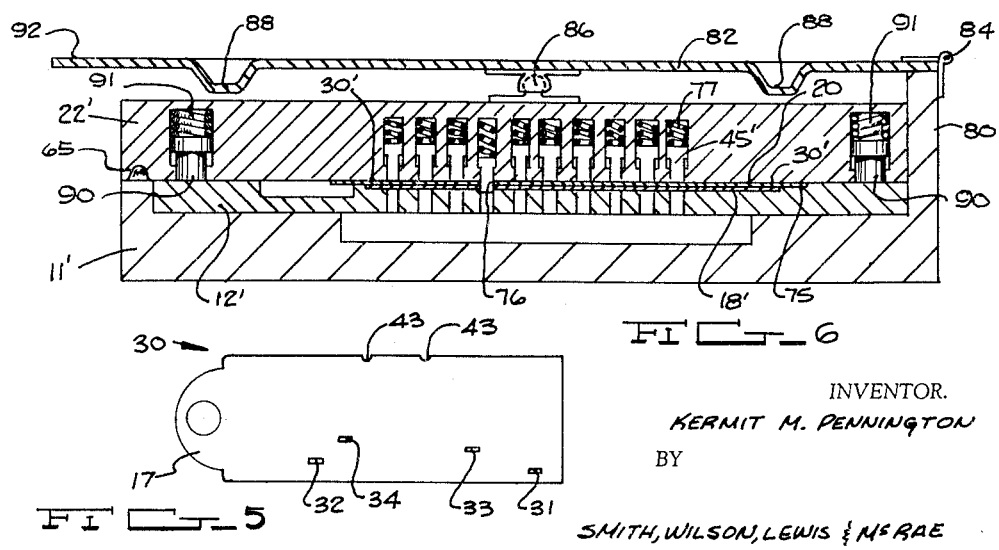
INVENTOR.
KERMIT M. PENNINGTON
BY
SMITH, WILSON, LEWIS & McRAE

United States Patent Office 3,008,633
Patented Nov. 14, 1961

3,008,633
CREDIT MECHANISM EMPLOYING CARD PUNCH MEMBERS
Kermit M. Pennington, 5811 Luce Road, Alma, Mich.
Filed Feb. 26, 1958, Ser. No. 717,742
10 Claims. (Cl. 234—45)

This invention relates to a low cost card-punching mechanism which can be employed by department stores, travel agencies, gasoline station attendants and other similar sales people to record "charge" sales. For purposes of illustration the invention will hereinafter be described in connection with its use by gasoline station attendants.

Objects of the invention are to provide a card-punching mechanism of the above-mentioned type wherein:

(1) A customer identity plate (carried by each customer and differently configured in accordance with the customer's account number) can be inserted into the mechanism to enable the mechanism to automatically punch holes in the card at different positions in accordance with the configuration of the customer identity plate, thereby eliminating any writing or printing on the part of the attendant, and enabling the card to be automatically processed in card-scanning equipment located in the billing department of the oil company home office.

(2) The mechanism incorporates a system of "sale value identity" arms which can be set to cause the card to be punched at selected points in accordance with the value of the customer's purchase, thereby enabling the card to be subsequently processed in the home office billing machines without requiring any manual transcribing of the dollar purchases.

(3) The mechanism is of such construction as to be quickly and easily operated by inexperienced personnel.

(4) The mechanism is of such design as to be usable with a wide range of customer identity plate configurations, thereby enabling similarly designed machines to be used throughout all parts of the country with the assurance that any customer can be accommodated, even if he is travelling far from his home at the time of his purchase.

(5) The mechanism is of such design as to be manufacturable as a compact low cost item, thereby enabling it to be used in the smallest gas station where the volume of "charge sale" business may not support the use of expensive recording equipment.

Other objects of this invention will appear in the following description and appended claims, reference being had to the accompanying drawings forming a part of this specification wherein like reference characters designate corresponding parts in the several views.

In the drawings:

FIG. 1 is a top plan view of one embodiment of the invention.

FIG. 2 is a sectional view on line 2—2 in FIG. 1.

FIG. 3 is a sectional view on line 3—3 in FIG. 1.

FIG. 4 is a sectional view on line 4—4 in FIG. 2.

FIG. 5 is a plan view of a customer identity plate utilized in the FIG. 1 mechanism.

FIG. 6 is a sectional view through a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a card-punching mechanism 10 including a base structure 11. Removably positioned in structure 11 is a flat wall 12 having two sets of openings generally designated by numerals 14 and 16. There are one hundred openings in the set of openings 14, with the individual openings arranged in parallel rows, ten openings per row. Openings 14 may be considered as "customer identity" openings for reasons which will appear later in the description.

Openings 16 comprise fifty openings arranged in five parallel rows. Each row of openings represents a given money denomination, as for example "cents," "tens of cents," "dollars," "tens of dollars," and "hundreds of dollars." The openings in each row represent a given value from zero to nine. With the illustrated number of openings it is possible to record any purchase from one cent up to nine hundred ninety nine dollars and ninety nine cents.

Wall 12 is recessed at 18 to form a cavity for accurately positioning a rectangular card 20. Portions of wall 12 and base structure 11 are cut out at 21 to permit the operator to insert his finger beneath the card and extract it from the cavity. In order to collect punchings from openings 14 and 16 base structure 11 is hollowed out to form a receptacle 23. The base structure may be periodically inverted to discharge the collected punchings.

Base structure 11 is connected with a force-applying housing structure 22 by means of hinges 19, the arrangement being such that the structure 22 can be manually raised about the hinge axis to permit insertion and removal of card 20.

The left end portion of housing structure 22 is provided with a rectangular recess 24 defined by lines 25, 26, 27 and 28. Recess 24 forms a seat 29 for a customer identity plate 30. Plate 30 is preferably about the size of a conventional automobile ignition key and is formed with an apertured extension 17 for convenient carrying on the automobile driver's key chain. As can be seen in FIG. 5 plate 30 is provided with four rectangular buttons 31, 32, 33 and 34. These buttons may be conveniently formed by deforming portions of plate 30 as shown in FIGS. 3 and 5.

Recess 24 is located directly above openings 14; consequently when plate 30 is positioned on seat 29 the four buttons 31 through 34 align with selected ones of the set of openings 14. The disposition of the buttons on the illustrated plate 30 is such that button 31 aligns with opening 35 (FIG. 4), button 32 aligns with opening 36, button 33 aligns with opening 37, and button 34 aligns with opening 38. Opening 35 is located in a row of openings 39 which represent the last digit in the customer's account number, opening 36 is located in a row of openings 40 which represent the next digit, opening 37 is located in a row of openings 41 which represents the next succeeding digit, and opening 38 is located in a row of openings 42 which represents the first digit in the customer's account number. By arbitrarily designating each opening in a row to represent a number (from zero to nine as shown in FIG. 4) it will be seen that the disposition of the buttons 31 through 35 is such that plate 30 corresponds to a customer identity account number 6270. Utilizing various combinations of the openings in set 14 it is possible to form customer identity plates for millions of different account numbers. In this connection it will be realized that each customer will be provided with a customer identity plate having a different button arrangement. If desired all of the various identity plates 30 for a given company may be formed with one or more notches 43 arranged to mate with projections extending from wall surface 26. In this manner, a plate issued by one company would be prevented from being honored by another company.

Housing structure 22 is formed with a series of one hundred guideways 44 which register with the different openings in set 14. Slidably disposed in each guideway is a cutting die 45 having a rectangularly cross sectioned cutting head 46 arranged to project through card 20 and the subjacent opening in wall 12 so as to punch a rectangular hole in the card. A compression spring 48 normally holds each die 45 raised above card 20 except when depressed by the buttons on plate 30.

In order to retain plate 30 in position on seat 29 there is provided a flat abutment plate 50 pivotally carried on structure 22 by means of hinges 51. A manually operated latch 52 holds the abutment plate in its FIG. 3 latched position.

In use of the illustrated mechanism abutment plate 50 is initially opened to permit insertion of customer identity plate 30 onto seat 29. Abutment plate 50 is then closed and latched in place so as to cause the buttons on plate 30 to depress selected ones of the die elements 45. Structure 22 is then raised to permit card 20 to be placed in cavity 18. Subsequent lowering of structure 22 causes the selected die elements to punch rectangular holes through the card. Base structure 11 is provided with four dome-shaped projections 65 which register with and guidingly coact with recesses formed in housing structure 22 for the purpose of accurately aligning the die elements with the openings 14. The arrangement of the holes in card 20 will of course correspond with the arrangement of buttons on plate 30; consequently the card can later be used by the home office in its accounting machines to automatically produce the customer billings.

In order that the illustrated mechanism can automatically produce a record of the customer's dollar value purchase there are provided a series of five slide elements 55 mounted for rectilinear movement on a series of fixed guide bars 56 carried within housing structure 22. Each slide element carries a punch element 57 which is adapted to selectively register with any of the ten openings in a particular row of the "dollar value" openings 16 (FIG. 4). As previously indicated there are five rows of dollar value openings, each row representing a particular money denomination, as for example "cents," "tens of cents," "dollars," etc., when reading from right to left in FIG. 4.

The various slide elements 55 are manually moved along guide bars 56 by means of rectangularly cross sectioned arms 59 which project through elongated slots 60 in housing structure 22. The openings 16 must of necessity be quite close together in order to be usable with card 20; consequently punch elements 57 and slide elements 55 must also be located very close together. However, the manually engageable end portions of arms 59 should be spaced considerable distances apart in order to allow convenient manual manipulation of the arms. Therefore slots 60 are spaced considerable distances apart, and the various arms 59 are angled upwardly away from the respective slide elements before they project through the slots. It will be noted that each slot is provided with ten notches 62. These notches 62 are spaced in accordance with the spacing of the openings in each row of openings 16. Suitable indicia are printed on the upper face of the housing structure to indicate the notch position. Arms 59 have an inherent springiness which allows them to automatically enter into any given notch except when moved manually for repositionment into another notch. The use of notches 62 insures that the punch elements 57 will exactly align with the selected one of openings 16.

In use of the mechanism, before card 20 is placed in cavity 18 the arms 59 are moved into the desired notches 62 in accordance with the customer's dollar purchase. For example, the position of arms 59 in FIG. 1 would indicate a dollar purchase of seven hundred twenty-four dollars and thirty-eight cents.

After arms 59 have been set in the desired notches 62 (and customer identity plate 30 has been locked in recess 24 on seat 29 as previously described) an unperforated card 20 is positioned in cavity 18. Housing structure 22 is then lowered to cause punches 57 to punch through card 20 into the aligned openings 16. The positional relationship of the holes formed in the right end portion of card 20 is a record of the dollar value purchase. At periodic intervals a batch of the perforated cards may be forwarded to the home office for insertion into accounting machines used for billing the customer.

Use of the illustrated mechanism is particularly advantageous because of the elimination of "information transcribing" operations usually employed in the home office. The perforated cards produced by the illustrated mechanism may be inserted into the accounting machine for direct production of customer bills.

The illustrated mechanism may be made as a relatively low cost, compact structure measuring less than ten inches on a side. Thus, it can be positioned on the gas station attendant's counter without taking up valuable floor space.

In using the mechanism the chance for human error is greatly reduced. The customer identity plate automatically insures billing the correct customer. All of the various arms 59 can be set into the correct notches before any holes are formed in the right end portion of the card; as a result the operator can check the position of arms 59 before he inserts the card into the mechanism. In this manner, if the operator has made any error in setting arms 59 he can correct it before the error appears as a hole in the card.

Referring now to FIG. 6, the structure there shown comprises a base structure 11' having its back wall 80 extended above the plane of a force applying housing structure 22'. An arm 82 is hingedly mounted on wall 80 at point 84 so as to overlie structure 22'. A ball-socket connection 86 is provided between arm 82 and a central point on structure 22' for the purpose of allowing structure 22' to have a limited rockable motion about the ball center. In this manner structure 22' can be made to lie exactly flush on wall 12' (in the depressed position) even in the event of poor parts alignment. Arm 82 is provided with bulged down projections 88 for preventing excess wobbling of structure 22' during the raising and lowering operations. Base structure 11' removably carries a flat wall 12' which is provided with a recess 18' for receiving an unperforated card 20. Adjacent one end of wall 12' there is formed a shallow depression 75 for removably receiving a customer identity plate 30' in overlying relation with respect to card 20. Plate 30' is provided with a number of openings 76 arranged in rows in the same manner as the previously mentioned buttons 31 through 34. The arrangement of the various openings 76 is predetermined to correspond with the customer's account number.

Force-applying structure 22' carries a series of one hundred cutting dies 45' arranged in ten rows in the same manner as previously mentioned dies 45. A compression spring 77 urges each of dies 45' downwardly.

In operation of the FIG. 6 mechanism, after card 20 and plate 30' have been inserted into the mechanism, structure 22' may be lowered to its FIG. 6 position so as to cause certain of the cutting dies 45' to pass through openings 76 and card 20 as shown. Those cutting dies which do not register with any of the openings 76 are caused to strike plate 30' and thereby have an upward movement in structure 22'. As a result holes are formed in card 20 only at those points located directly below the openings 76. The hole arrangement in the card thereby corresponds to the customer's account number.

The FIG. 6 embodiment includes a plurality of plungers 90 slidably carried in structure 22' and urged downwardly by a plurality of heavy compression springs 91. In operation, after the holes have been formed in card 20 and the manual pressure released automatically from handle portion 92 springs 91 become effective to automatically force structure 22′ upwardly so as to permit easy removal of card 20 and plate 30′.

It will be readily apparent that the handle portion 92 and the springs 91 and plungers 90 may be applied, if desired, to the embodiments shown in FIGS 1 through 4 inclusive. Also, if desired, the FIG. 6 embodiment may be used without the handle portion 92, the springs 91 and the plungers 90.

The dollar value of the customer's purchase may be recorded on card 20 with the same mechanism shown in FIG. 2, it being understood that the "dollar purchase" mechanism is arranged in the same housing as the "customer account number" mechanism (as shown in FIG. 1).

In connection with the customer account number mechanism, it will be noted that the FIG. 1 mechanism employs a plate 30 having a series of buttons, whereas the FIG. 6 mechanism employs a plate 30′ having a series of openings 76. In the claims the term "surface discontinuities" is employed to generically cover the "button" and "opening 76" arrangements.

I claim:

1. Card punching mechanism comprising a flat wall; a force-applying structure mounted for movement toward and away from the flat wall; a plurality of parallel cutting dies slidably carried within the force-applying structure; a customer identity plate having a series of die-operating buttons at predetermined points thereon; means on the force-applying structure for releasably locking the customer identity plate therewithin; whereby, when a card is positioned on the flat wall and the customer identity plate is locked within the force-applying structure selected ones of the dies are caused to project beyond the remaining dies, and when the force-applying structure is moved toward the flat wall the selected dies are caused to punch through the card.

2. The combination of claim 1 wherein the identity plate locking means is defined by (1) a cavity formed in an external surface of the force-applying structure and (2) a clamping member movably mounted on the force-applying structure to hold the identity plate in place after its insertion into the cavity.

3. The combination of claim 1 wherein the identity plate locking means is defined by (1) a shallow cavity formed in an external surface of the force-applying structure and (2) a clamping member mounted on the force-applying structure movable against one face of the identity plate to retain said plate in the cavity.

4. Card punching mechanism for use in sales stations, said mechanism comprising a flat wall having first and second sets of openings therethrough; each set of openings comprising a number of equally spaced openings arranged in parallel rows; a housing structure mounted for movement toward and away from the flat wall; said housing structure having a set of guideways therein, each of said guideways being positioned to register with one of the openings in the first set of openings when the housing structure is immediately adjacent the flat wall; a cutting die slidably positioned in each guideway for movement toward and away from the registering opening; a replaceable die-controlling customer identity plate having a series of surface discontinuities spaced apart by distances proportional to the spacing between the rows of dies and the spacing between the dies in each row, the number of surface discontinuities being less than the number of cutting dies; a seat for releasably retaining the customer identity plate in die-controlling position; a series of slide elements mounted in the housing structure for rectilinear movements at right angles to the paths of motion of the cutting dies; and a sale value identity punch carried by each slide element in selective registry with any opening in a given row of the second set; whereby when a card is positioned on the flat wall and the customer identity plate is positioned on its seat, the housing structure can be moved toward the flat wall to simultaneously (1) cause the cutting dies in registry with the surface discontinuities to be projected through the card and thereby furnish a customer identity hole pattern in said card and (2) cause the sale value identity punches to be projected tthrough the card into selected ones of the second set of openings so as to indicate the sale value on the card.

5. The combination of claim 4 wherein the surface discontinuities take the form of buttons projecting from the customer identity plate.

6. The combination of claim 4 wherein the surface discontinuities take the form of openings in the customer identity plate.

7. Card marking mechanism for use in sales stations, comprising a card seating wall structure; stations comprising a housing structure mounted for movement toward and away from said wall structure; said housing structure having a set of guideways therein, each one of said guideways being positioned to register with a preselected portion of a card when seated on the wall structure; a marking element slidably positioned in each guideway; a marking element-controlling customer identity plate having a series of surface discontinuities spaced apart by distances proportional to the spacing between the guideways; a seat for releasably retaining the customer identity plate in marking element controlling position; a series of slide elements mounted in the housing structure for rectilinear movement at right angles to the paths of motion of the marking elements; and a sale value identity marker carried by each slide element for selective registry with a portion of a card when seated on the wall structure; whereby when the customer identity plate is positioned on its seat the housing structure may be moved toward the wall structure to simultaneously (1) cause the marking elements in registry with the surface discontinuities to be projected against the card so as to indicate the customer identity on said card, and (2) cause the sale value identity markers to be projected against the card so as to indicate the sale value on the card.

8. The combination of claim 7 wherein the surface discontinuities take the form of buttons projecting from the customer identity plate.

9. The combination of claim 7 wherein the surface discontinuities take the form of openings in the customer identity plate.

10. In a card punching mechanism, a card seat, a housing movable with respect to said card seat, said housing carrying a series of customer identity-card cutting dies registering with a portion of said seat, a die-controlling customer identity plate having a surface discontinuity pattern and positionable within said housing to select the dies which are to be effective against the card, a seat for releasably retaining said customer identity plate in die controlling position; a series of sales value identity punches in said housing registering with another portion of said seat, means for setting said sales value identity punches in accordance with the value of the sale, and means for moving said housing into contact with said card seat, whereby said selected dies and said punches are driven through the card to form a customer identity pattern and a sales identity pattern therein.

References Cited in the file of this patent

UNITED STATES PATENTS

| | | |
|---|---|---|
| 447,089 | Brandis | Feb. 24, 1891 |
| 1,140,505 | Day | May 25, 1915 |
| 1,193,390 | Hollerith | Aug. 1, 1916 |
| 1,254,164 | Shanklin | Jan. 22, 1918 |
| 2,110,854 | Fuller et al. | Mar. 15, 1938 |
| 2,225,313 | McCart | Dec. 17, 1940 |
| 2,906,335 | Love | Sept. 29, 1959 |